United States Patent [19]

Reeberg

[11] 4,155,636
[45] May 22, 1979

[54] HOLD STEADY STRAP

[76] Inventor: Christiaan Reeberg, 111-67 145th St., Jamaica, N.Y. 11435

[21] Appl. No.: 938,879

[22] Filed: Sep. 1, 1978

[51] Int. Cl.² ........................ A44B 21/00; G03B 17/00
[52] U.S. Cl. ..................................... 354/293; 24/73 R
[58] Field of Search ..................... 354/74, 81, 82, 293; 24/73 GS, 73 HH, 73 HL, 73 LA, 73 R, 81 AG

[56] References Cited

U.S. PATENT DOCUMENTS

| 1,766,090 | 6/1930 | Wörsching | 354/293 X |
| 2,190,268 | 2/1940 | Magid | 24/2.5 UX |
| 2,658,435 | 11/1953 | Sarvoy | 354/82 X |
| 2,723,430 | 11/1955 | Paillard | 354/293 X |
| 3,672,004 | 6/1972 | Smith | 24/73 HH |

FOREIGN PATENT DOCUMENTS

| 22718 of | 1895 | United Kingdom | 24/73 GS |
| 188145 | 11/1922 | United Kingdom | 354/293 |

*Primary Examiner*—Donald A. Griffin
*Attorney, Agent, or Firm*—Richard L. Miller

[57] ABSTRACT

A photographer's accessory for holding a camera steady during picture taking; the device including a strap having a buckle for length adjustment, an elastic on one end of the strap being connected to a camera and the other end of the strap having either a belt hook or else a foot stirrup.

4 Claims, 4 Drawing Figures

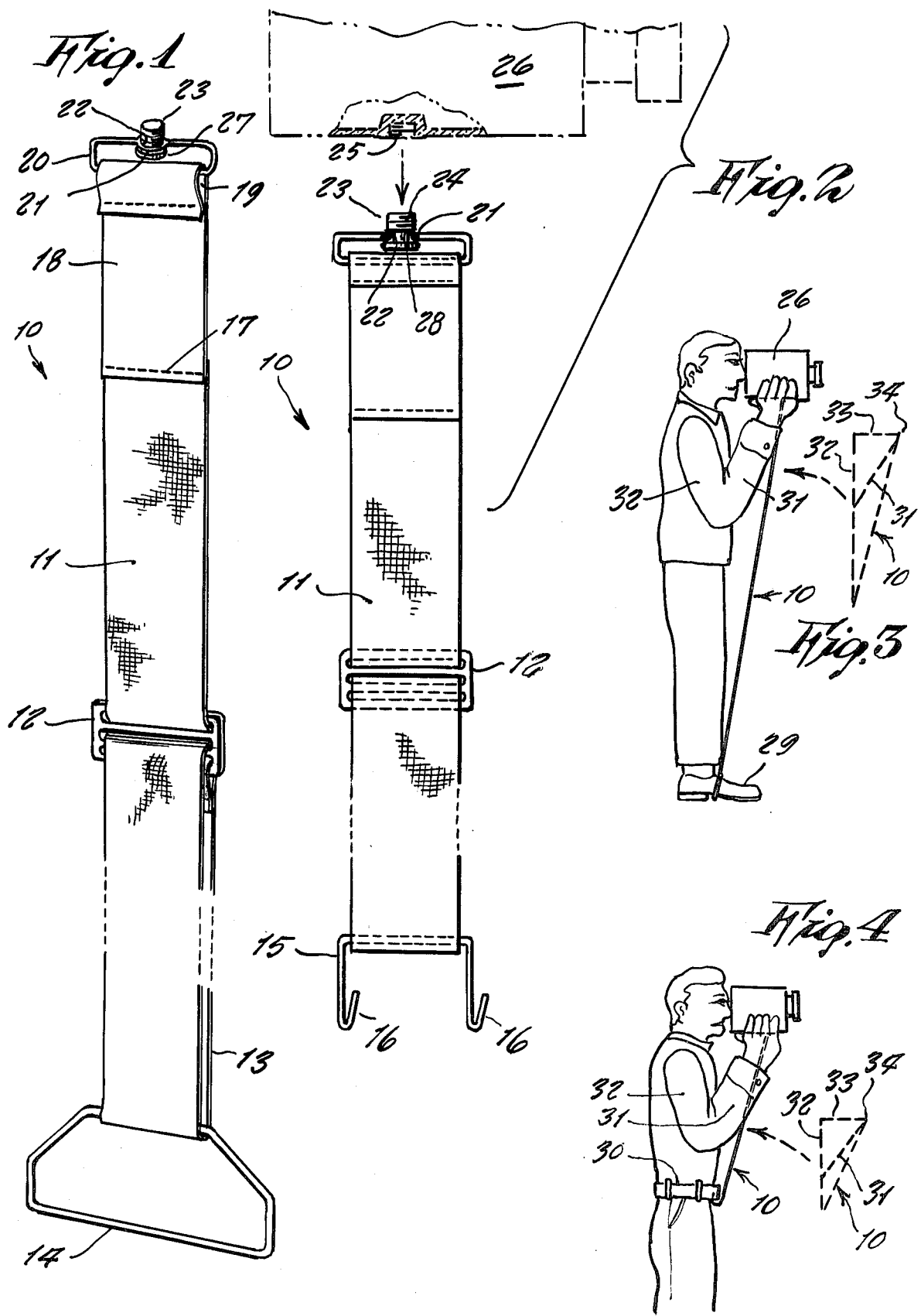

HOLD STEADY STRAP

This invention relates generally to photograph accessories.

It is well known that an important feature in taking a still photograph is for the photographer to hold the camera steady without any movement so that the photograph will be sharp instead of blurred. Accordingly photographers sometimes try to brace themselves against a steady object such as against a tree or other stationary object, while they depress a camera shutter lever. When no steady object is available to brace against, they must then depend only upon themselves, so that this situation is therefore in want of an improvement.

Accordingly it is a principal object of the present invention to provide a device for steadying a hand-held camera by a free standing photographer.

Another object is to provide a hold steady strap which utilizes the principal of the rigidity of a triangle for obtaining steadiness; and wherein the camera rigidly held against a photographer's face forms a horizontal leg of the triangle, the vertical rigid body of the photographer forms a vertical leg of the triangle, and a taut strap between the camera and lower portion of the photographer's body forms a diagonal leg of the triangle; or alternately the strap forms a tension brace for a triangle in which the forearm and upper arm form legs of a rigid triangle.

Still a further object is to provide a hold steady strap which rolls up so to be conveniently carried in either a camera accessory bag, a purse or pocket.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

FIG. 1 is a perspective view of the invention shown per se, and showing one model design thereof that is adaptable for securement to a photographer's foot.

FIG. 2 is a side view of the invention in relation to a camera for securement thereto, and showing another model design that is adaptable for securement to a wearer's belt.

FIG. 3 is a side view of the invention shown in use, and attached to a foot.

FIG. 4 is a similar view thereof shown in use, and attached to a belt.

Referring now to the drawing in greater detail, the reference numeral 10 represents a hold steady strap according to the present invention wherein there is an elongated strap member 11 made of woven fabric such as canvas or the like. The fabric member 11 is attached at one end to a sliding buckle 12 which is slidable along an intermediate portion of the fabric member so to shorten or lengthen it, as needed. Accordingly the member 11 is formed with a loop 13 at its one end, and which is looped around either a stirrup 14 or else a hook 15, both of which are made of a stiff wire, the stirrup being in the shape of a generally triangular loop while the hook is bent into a U-shape with a parallel hook elements 16 at each end.

The opposite end of the fabric material is secured by a stitch 17 to one end of a short length of elastic tape 18 which at its other end is stitched into a loop 19 around a stiff wire flat ring 20 that includes a circular portion 21 around a circular opening 22 in which a freely rotatable screw 23 is held captive. The screw includes a threaded shank 24 engagable in a threaded opening 25 conventionally provided on practically all cameras 26 for normal tripod support. The screw includes a knurlled head 27 for easy turning of the screw by hand, and a narrow neck 28 between the shank and head result in an annular groove in which the circular portion 21 is retained. The head 27 is inside the flat loop of ring 20.

In operative use it is now evident that the embodiment of FIG. 1 of the invention with stirrup 14 is utilized as shown in FIG. 3 with a foot 29 being being placed in the stirrup. The embodiment of FIG. 2 of the invention with hook 15 is utilized as shown in FIG. 4 with the hook being attached to a trouser's belt 30. In use, a triangle formed by forearm 31, upper arm 32, and a horizontal leg 33 of the camera rigidly held against a face, is steadied from collapse by tension on the triangle apex at 34.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention what I claim as new and desire to secure by letters Patent is:

1. A hold steady strap, comprising in combination, a longitudinal strap member of woven fabric attached at one end to a sliding buckle, slided on an intermediate portion of said strap member so as to form an adjustable loop at one end of said hold steady strap, an opposite end of said strap member being stitched to one end of a short elastic tape which at its other end is attached to a ring fitted with freely rotatable screw for attachment to a camera threaded opening, and means fitted on said strap member loop for attachment to either a person's foot or belt.

2. The combination as set forth in claim 1 wherein said means comprises a foot stirrup.

3. The combination as set forth in claim 1 wherein said means comprises a hook.

4. The combination as set forth in claim 3 wherein said hook includes two hook elements.